May 11, 1926.

E. G. RATZ 1,584,649

WATT HOUR METER

Filed May 19, 1923  2 Sheets-Sheet 1

WITNESSES:

INVENTOR
Elmer G. Ratz
BY
ATTORNEY

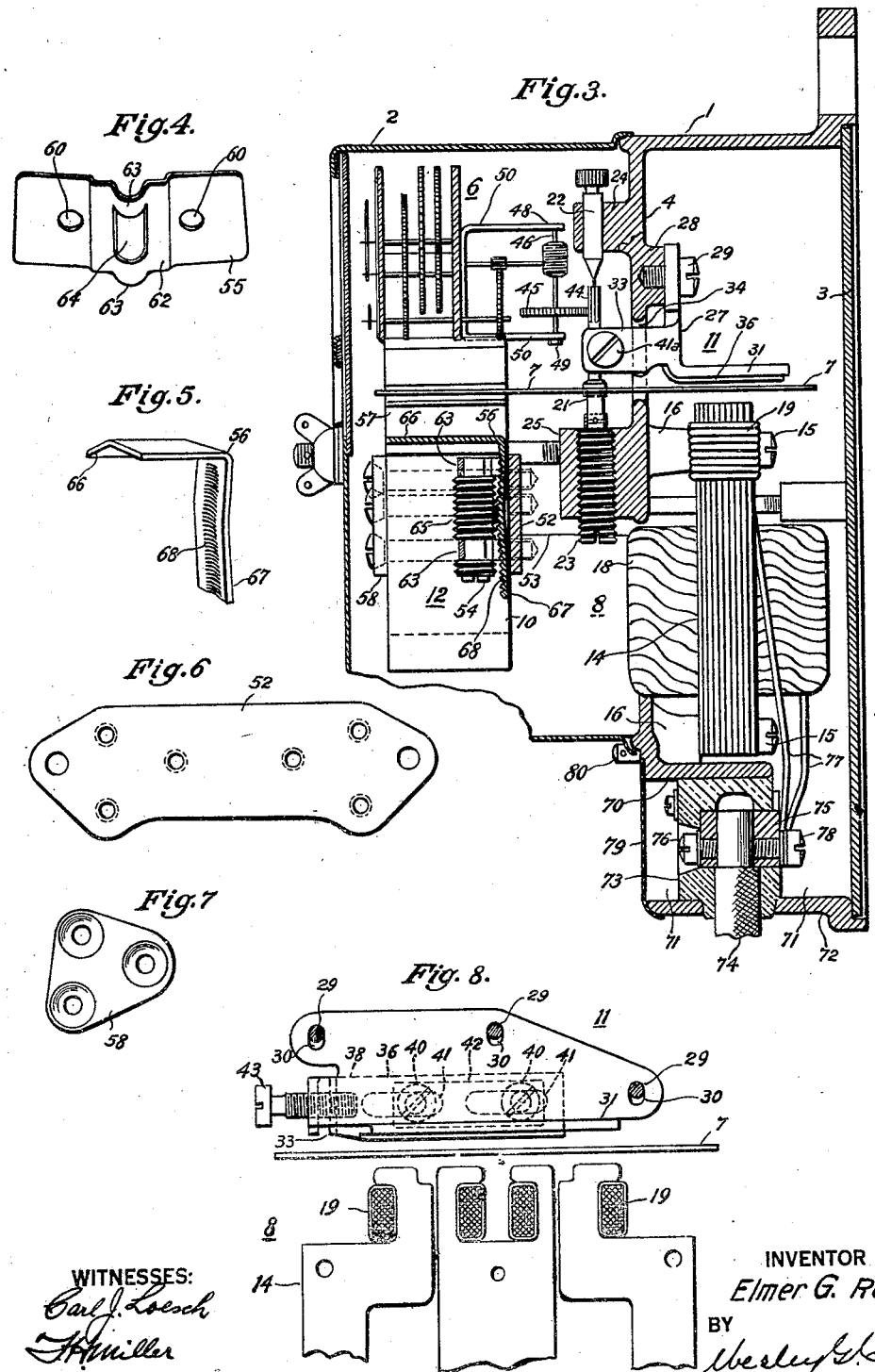

Patented May 11, 1926.

1,584,649

UNITED STATES PATENT OFFICE.

ELMER G. RATZ, OF HAMILTON, ONTARIO, CANADA, ASSIGNOR TO WESTINGHOUSE ELECTRIC & MANUFACTURING COMPANY, A CORPORATION OF PENNSYLVANIA.

WATT-HOUR METER.

Application filed May 19, 1923. Serial No. 640,067.

My invention relates to electrical measuring instruments and particularly to watt-hour and similar meters.

One object of my invention is to provide an instrument of the above indicated character that shall be simple and durable in construction, economical to manufacture and effective in its operation.

Another object of my invention is to provide an electrical measuring instrument in which certain adjustably related parts may be removed and replaced without readjustment.

Another object of my invention is to provide an electric meter in which certain adjustably related parts shall be self-locking to preserve the adjustment thereof.

Another object of my invention is to provide an electric meter having an integrating mechanism in which the primary moving element, for receiving movement from the meter element, shall be movable about a vertical axis, thereby permitting the use of a vertical-thrust jewel bearing and greatly improving the accuracy of the instrument.

Another object of my invention is to provide a terminal structure or compartment for a meter casing by which the casing is maintained dust proof and the connection of the meter to its line conductors is greatly facilitated.

A further object of my invention is to so dispose all of the current conducting parts of an electric meter having a rotating disk or armature on one side of the disk as to prevent the possibility of interference with the disk by the conductors.

My general aim being to improve the operation, to simplify and economize the manufacture and to facilitate the assembly and mounting of an otherwise usual type of watt-hour meter, my invention assumes the nature of an improvement in several co-related or sub-combinations thereof.

My invention is like other watt-hour meters, in that it employs an integrating mechanism, a rotating armature disk, an electromagnet comprising current and voltage coils, a light-load adjustment, damping magnets, a full-load adjustment and a terminal structure.

However, in practicing my invention, I so modify the construction and relation of the above-mentioned parts as to render the instrument more accurate in operation, its adjustments easily made and permanent, its construction durable, compact and economical, its mechanism dust-proof and protected against tampering by unauthorized persons, and its assembly, mounting and dismounting for inspection comparatively easy.

Figure 1 of the accompanying drawings is a front elevational view of a watt-hour meter embodying my invention, with the cover removed and parts broken away for clearness.

Fig. 3 is a side view, partially in section and partially in elevation, of the device shown in Fig. 1, Figs. 4, 5, 6 and 7 are detailed views of members embodied in the full load adjusting device of the instrument.

Fig. 8 is a detailed rear elevational view of parts of the meter showing particularly the light load adjusting mechanism in relation to the electromagnet of the meter.

Figure 1:
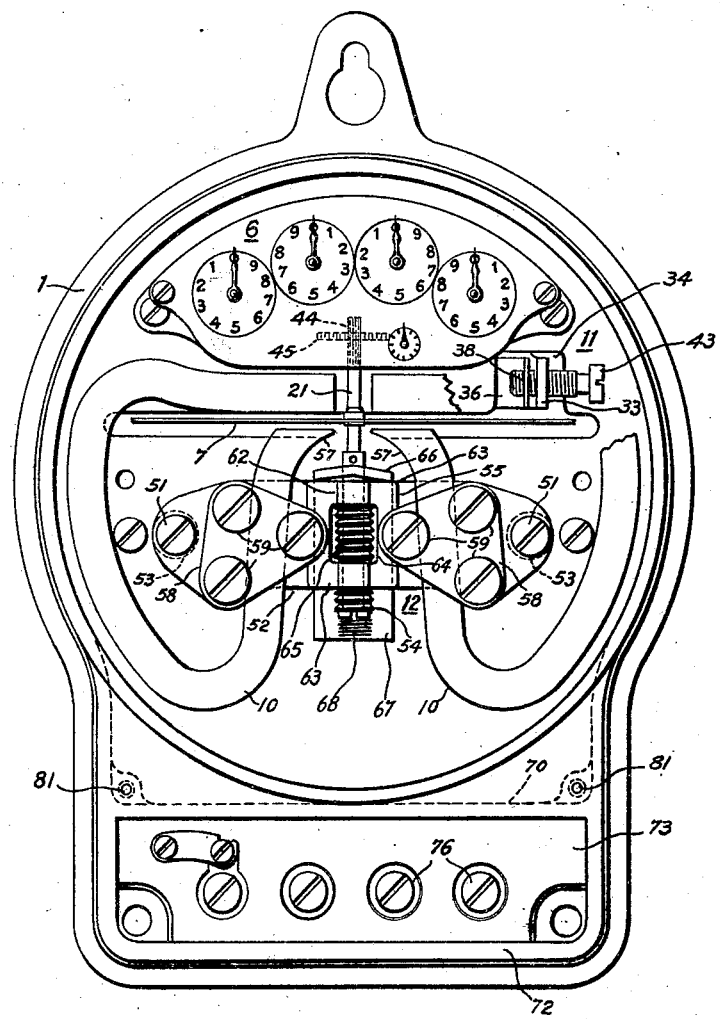
Figure 2:
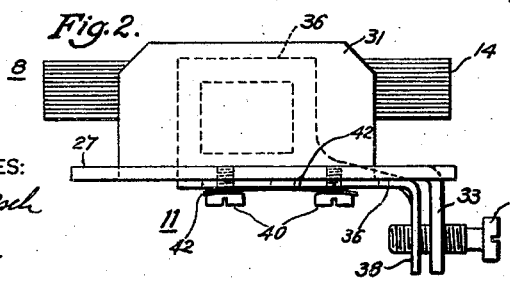
Fig. 2 is a detailed plan view of a light-load adjustment mechanism therefor.

The instrument casing comprises an inner or base portion 1, preferably of cast metal, a front or cover portion 2 and a rear wall member 3. The base portion 1 of the casing is provided with a wall or portion 4 intermediate the members 2 and 3 which supports an integrating mechanism 6, an armature disk 7, an electromagnet 8, damping magnets 10, a light load adjusting device 11 and a full-load adjusting device 12.

The electromagnet 8 comprises a core member 14 secured as by screws 15 to lugs 16 on the wall 4, a voltage coil 18 and current coils 19.

The disk 7 is mounted on a vertical shaft 21 that is supported in upper and lower bearing members 22 and 23 that are, respectively, mounted in lugs or projecting portions 24 and 25 on the wall 4.

The light load adjusting mechanism 11 comprises a stationary magnetizable keeper member 27, of substantially L-shape having its vertical arm adjustably secured to lugs 28 on the wall 4, as by screws 29 that extend through slots 30 in the member 27, and its horizontal arm 31, constituting a flat plate, disposed above the core member 14 in spaced relation thereto. A projection 33 on the member 27, extends forwardly through an opening 34 in the wall 4 to the front compartment of the meter in the cover member 2. A movable metal member 36, conforming in side elevation, to the under and rear sides of the magnetizable member 27, is also provided with a forwardly projecting portion 38 that extends through the opening 34 in the wall 4. The member 36, constituting a shading coil or short-circuited loop, is movably mounted on the stationary member 27 by screws 40 that extend through slots 41 in the member 36 and into the vertical arm of the member 27.

A screw 41 is connected between the projections 33 and 38 of the members 27 and 36, resectively, for moving the member 36 across the poles of the magnet 14. A leaf spring 42, having openings by which it is placed over the screws 40, biases the member 36 against the member 27.

The shaft 21 is provided with a gear or pinion portion 44, adjacent to its upper end, for engagement with a gear wheel 45 that is mounted on a shaft 46 and constitutes the primary moving element of the indicating mechanism 6.

The shaft 46 is mounted in upper and lower bearings 48 and 49, respectively, that are mounted in stationary arms 50. The lower bearing 49 constitutes a jeweled thrust bearing of a usual type.

The full load adjusting mechanism 12 is mounted on a bridging member 52 that extends between lugs 53, projecting forwardly from the wall 4, and is secured thereto by screws 51. A vertical worm screw 54 is supported, by a member 55, on the member 52 and is adapted to engage and move a magnetizable member 56 toward and away from the pole ends 57 of the permanent magnets 10. The permanent magnets 10 and the member 55 are held in position by a pair of triangular plates 58, that are secured to the bridging member 52 by screws 59, two of the screws 59, in connection with each plate 58, being on the outside of the lower pole arm of its respective magnet 10 and the other screw being on the inside thereof. The latter screw projects through openings 60 in the member 55 to position the latter, which are clamped against the bridging member 12 by the lower arms of the magnets 10, when the latter are clamped into position by the screws 59.

The member 55 is provided with an intermediate raised portion 62 having upper and lower bearing portions 63 for the screw 54 and an opening 64 through which an intermediate portion 65 of the screw 54 extends.

The magnetizable member 56 is formed of substantially L-shape having its upper arm 66 of substantially inverted V-shape in cross-section, which extends across the pole ends 57 of the magnets 10, and its lower arm 67 slightly bowed for resilient clamping action between the screw 54 and the bridging member 52. The arm 67 of the member 56 is provided on its inner bowed surface with grooves or teeth 68 for engagement with the screw 54. Thus, when the screw 54 is turned, the member 56 is raised or lowered, in accordance with the full load adjustment required and the construction and relation of parts tends to keep it in adjusted position.

The wall 4 is provided with an integrally projecting wall or partition 70 that extends entirely across the instrument but for only a limited distance towards the rear wall member 3. The space below the wall 70 is occupied by a preferably molded insulating block 73. This construction provides a terminal compartment 71 that communicates, only at its rear side, with the upper portions of the casing.

The block 73 is provided with openings which register with openings in a wall 72 of the base member 1 for the reception of line conductors 74 which extend into contact terminal blocks 75, embedded in the block 73. The conductors 74 are held in position in the blocks 75 by screws 76 that are accessible from the front sides of the casing. Leads 77 for the current coil 19 and the voltage coil 18 are connected to the rear sides of the terminal blocks 73 by means of screws 78.

The coils 18 and 19 both being disposed on the same side of the disk 7, the leads 77 thereof do not cross the disk 7, which, as in an ordinary meter sometimes interferes with the operation of the disk. A removable cover member 79, for the block 73 is mounted on the base member 1, by screws 80 which enter openings 81 in the base member 1.

The permanent magnet 10 and the full-load adjusting mechanism 12, being mounted in fixed relation on the member 52, may be removed from the instrument by removing the screws 51 without disturbing the adjustment of the member 56.

Since the full-load adjusting mechanism is in the front part of the casing and the projections 33 and 38 of the light-load adjusting mechanism 11 project forwardly through the opening 34 in the wall 4, both the full and light-load devices are accessible from the front part of the casing.

A very slight difference in the width of the air-gap between the keeper 31 and the core member 14 causes a relatively great difference in the torque of the disk 7. By setting the full-load adjusting member 56 at such position as to give maximum adjustment each way, and then adjusting the keeper 31 slightly up or down on the screws 29, very accurate adjustment of the disk torque may be effected. In making this adjustment, the meter is operated in series with a standard meter, and the adjustment made permanent by tightening the screws 29.

Various changes in detail and arrangement may be made without departing from the spirit and scope of the invention, and such modifications are intended to be covered by the appended claims.

I claim as my invention:

1. A meter comprising a movable armature, a damping magnet, means for adjusting the damping effect of the magnet, and supporting means for the magnet permitting the magnet to be removed from the meter independently of said adjusting means and replaced and retaining the adjustment of said adjusting means.

2. In a meter, the combination with a main supporting structure, a movable armature, damping magnets and means for adjusting the damping effect of the magnets, of a single auxiliary supporting structure for securing the magnets and the adjusting means to the main supporting structure and permitting the magnets and the adjusting means to be removed and replaced relative to the main supporting structure while in fixed relation to each other.

3. In a meter, the combination with a main supporting structure, and a movable armature, of an auxiliary supporting structure removably secured to the main supporting structure, a pair of damping magnets for the armature mounted on the auxiliary supporting structure, and means mounted on the auxiliary supporting structure between the magnets for adjusting the damping effect thereof.

4. In a meter, the combination with a main supporting structure and a movable armature, of an auxiliary supporting structure removably secured to the main supporting structure, a pair of damping magnets for the armature mounted on the auxiliary supporting structure, means mounted on the auxiliary supporting structure between the magnets for adjusting the damping effect thereof, and means for clamping the magnets and the adjusting means in position on the auxiliary supporting structure.

5. In a meter, the combination with a main supporting structure and a movable armature, of an auxiliary supporting structure removably secured to the main supporting structure, a pair of damping magnets for the armature mounted on the auxiliary supporting structure, means mounted on the auxiliary supporting structure between the magnets for adjusting the damping effect thereof and having portions between the magnets and the auxiliary supporting structure, and means for clamping the magnets against said portions to hold the magnets and the adjusting means in position.

6. In a meter, the combination with a supporting structure and a movable armature, of a damping magnet for the armature mounted on the supporting structure, means mounted on the supporting structure for adjusting the damping effect of the magnet and having a portion between the magnet and the supporting structure and means for clamping the magnet against said portion to hold the magnet and the adjusting means in position.

7. In a meter, the combination with a movable armature and means for actuating the same, of means for adjusting the movement of the armature comprising a magnet and magnetizable member movable relative to the magnet having a portion for cooperation with a worm screw, a stationary member, and a worm screw rotatably supported by the stationary member and engaging the worm screw portion of said magnetizable member.

8. In a meter, the combination with an armature disk and a pair of damping magnets therefor, of means for adjusting the damping effect of the magnets comprising a supporting member, a movable member having a magnetizable portion for adjustment relative to the poles of the magnets and a resilient depending portion for cooperation with a worm screw, a stationary member having a bearing portion mounted over said resilient depending portion on said base member, and a worm screw mounted in said bearing portion and engaging said depending portion, the relation of parts operating to bind the same together in adjusted position.

9. In a meter, the combination with a casing having a terminal compartment and openings in a side wall of the compartment, of an insulating block in the compartment having openings registering with the openings in the casing, a removable rear wall for the compartment disposed in spaced relation to said block and terminal members embedded in said block adapted to receive line conductors through said registering openings and to receive internal meter leads between the rear side of the block and said removable rear wall.

10. In a meter, the combination with a casing having a main instrument-receiving compartment, of a terminal compartment comprising an outer wall, an inner wall extending entirely across, and only partly along, the terminal compartment, a common removable rear wall for both of said compartments disposed in spaced relation to said inner wall and a terminal structure, including terminal members and an insulating block, disposed between said inner and outer walls to provide a space communicating with the main compartment between the rear of said block and said rear wall.

11. A meter comprising a rotatable disk armature, a pair of damping magnets therefor having pole ends adjacent to each other and each having a pole end on each side of said disk, and self-locking means including a magnetizable member adjustably mounted at one side of said disk and co-operating with the magnet poles at that side for controlling the damping effect of said magnets.

12. A meter comprising a rotatable disk armature, a pair of damping magnets therefor having pole ends adjacent to each other and each having a pole end on each side of said disk, a magnetizable member disposed at one side of said disk and movable relative to the magnet poles at that side along a path normal to the plane of the disk for controlling the damping effect of said magnets, and common means for mounting the magnets and said movable member in position.

13. In a meter, the combination with a movable armature and damping-magnet means therefor, of means for controlling the damping effect of said means comprising a member movable normal to one side of the disk relative to a magnet pole at that side having a magnetizable portion for affecting the flux of said damping means and a rack portion, and a worm screw for co-operation with said rack portion.

14. In a meter, the combination with a movable armature and damping-magnet means therefor, of means for controlling the damping effect of said means comprising a member having a magnetizable portion for affecting the flux of said damping means and a rack portion, a worm screw for co-operation with said rack portion, and a single integral member for supporting said screw having bearing portions adjacent to each end of the screw.

15. In a meter, the combination with a movable armature and damping-magnet means therefor, of means for controlling the damping effect of said means comprising a stationary member, a member having a magnetizable portion for affecting the flux of said damping means and a rack portion yieldingly held against said stationary member, and a worm screw for co-operation with said rack portion.

16. In a meter, the combination with a main supporting base member and a movable armature, of damping means for the armature comprising a pair of permanent magnets having adjacent pole ends, a magnetizable flux-adjusting member for co-operation with said ends, a plate supported on said base member, a bearing plate for said flux-adjusting member disposed over said plate, said magnets being disposed over both of said plates, tertiary plates disposed over said magnets, and means co-operating between said first and tertiary plates for holding said bearing plate and the magnets in position.

In testimony whereof, I have hereunto subscribed my name this 14th day of May, 1923.

ELMER G. RATZ.